United States Patent [19]

Dewaele

[11] 3,947,116

[45] Mar. 30, 1976

[54] PHOTOCOMPOSING MACHINES

[75] Inventor: Daniel Camille Cornelius Dewaele, Beselare, Belgium

[73] Assignees: Lamson Paragon Limited, London, England; Firma Dirk Strobbe PVBA, Izegem, Belgium

[22] Filed: Dec. 27, 1973

[21] Appl. No.: 428,630

Related U.S. Application Data

[63] Continuation of Ser. No. 161,245, July 9, 1971, abandoned.

[30] Foreign Application Priority Data

July 10, 1970 United Kingdom ............... 33692/70

[52] U.S. Cl. ..................................... 355/40; 353/25
[51] Int. Cl.² .......................................... G03B 27/52
[58] Field of Search ............. 355/40; 353/25, 26, 27

[56] References Cited

UNITED STATES PATENTS

| | | | |
|---|---|---|---|
| 3,594,581 | 7/1971 | Yamashita | 353/26 |
| 3,730,619 | 5/1973 | Fujimoto | 353/26 |
| 3,744,890 | 7/1973 | Suzuki | 353/26 |
| 3,744,891 | 7/1973 | Dennis | 353/27 |

*Primary Examiner*—Richard M. Sheer
*Attorney, Agent, or Firm*—Watson, Cole, Grindle & Watson

[57] ABSTRACT

A photocomposing machine for producing an exposed sheet for use in the preparation of printing plates. An image is positioned on a sheet of sensitized material by having an object mounted on a carrier and driving the carrier until the position of the image is correctly positioned. The accurate positioning of the image is controlled by a grid line counting device which causes the carrier to be halted at a position corresponding to one of the grid lines of the grid line counting device.

4 Claims, 7 Drawing Figures

INVENTOR

DANIEL CAMILLE CORNELIUS DEWAELE

BY

Watson, Cole, Grindle & Watson

ATTORNEYS

INVENTOR

DANIEL CAMILLE CORNELIUS DEWAELE

BY Watson, Cole, Grindle & Watson
ATTORNEYS

INVENTOR

DANIEL CAMILLE CORNELIUS DEWAELE

BY

ATTORNEYS

INVENTOR

DANIEL CAMILLE CORNELIUS DEWAELE

BY

Watson, Cole, Grindle & Watson

ATTORNEYS

INVENTOR

DANIEL CAMILLE CORNELIUS DEWAELE

BY

Watson, Cole, Grindle & Watson

ATTORNEYS

INVENTOR

DANIEL CAMILLE CORNELIUS DEWAELE

BY

*Watson, Cole, Grindle & Watson*

ATTORNEYS

PHOTOCOMPOSING MACHINES

This is a continuation of application Ser. No. 161,245 filed July 9, 1971, now abandoned.

This invention has reference to photocomposing machines.

In the specification of U.S. Pat. No. 3,576,365, there is described a photocomposing machine for use more particularly in connection with the exposure of light sensitive material to produce an exposed sheet copy to be developed and used in the production of printing plates for use more expecially in the manufacture of business forms.

In such a machine there is provided a mounting for a copy sheet. This copy sheet serves as a basis for positioning the representation of lines for text in such a way that a light sensitive sheet is exposed in a pattern to correspond to the pattern on the copy. This is achieved by aligning an image representing a part of the total pattern onto the copy representation and aligning the same image onto the sensitised material. The operation is repeated until the whole of the parts of the copy make up a representation of the total original copy. In such a machine as described it was not intended that the position of the images on the copy form and on the sensitised sheet should be accurately located.

It is an object of the present invention to provide an improved photocomposing machine.

It is a further object of the present invention to provide a photocomposing machine embodying means whereby the position of the images on the material shall be located more accurately than heretofore.

According to the present invention a photocomposing machine comprises means to mount a representation of a copy form, means to project an image corresponding to part of the copy form on to the representation and onto the sensitised material whereby parts of the copy representation are built up in steps on to the sensitised material and means for controlling the accurate positioning of the position of the exposure of the sensitised material comprising grid line counting means and means to align the position of the exposed part of the sensitised material on the grid lines under the control of the counting means.

A photocomposing machine in accordance with the present invention will now be described by way of example with reference to the accompanying drawings wherein.

Figure 1:
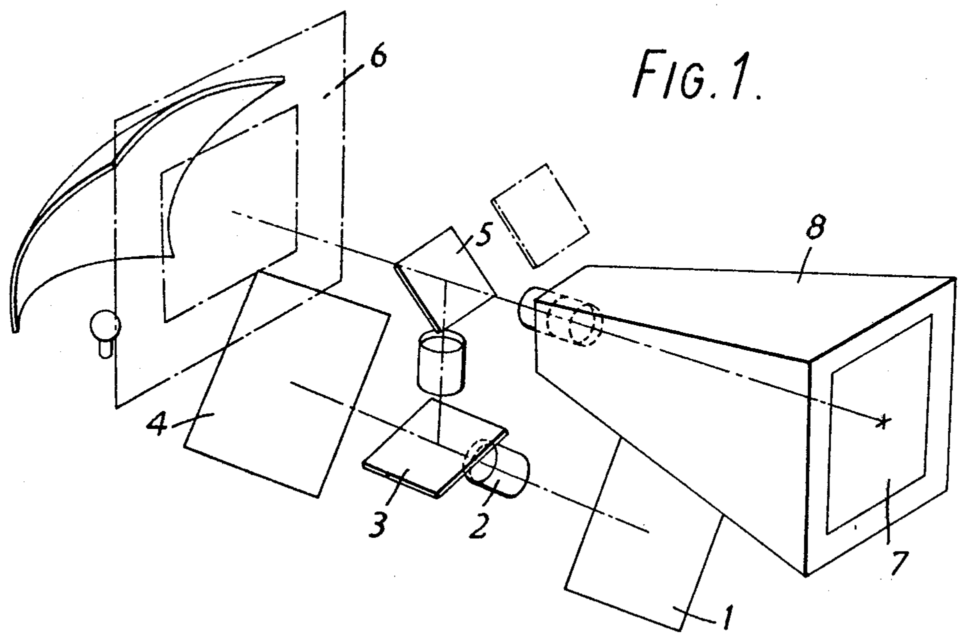
FIG. 1 is a view of a first embodiment of projecting apparatus for the machine.

Referring to FIG. 1 there is shown a representation of a copy sheet 1. A system of lamps and an optical system 2 and a semi-transparent mirror 3 are arranged to project an image of the representation of the copy form 1 onto the screen 4. A further mirror with an optical system 5 is arranged to project an image corresponding to part of the representation of the copy 1 on the screen 4 from the projector mechanism 6 onto a sensitised sheet 7 in a film box 8. The mechanism in the projector 6 is more fully shown in FIG. 4, and embodies a carrier which has mounted on it line projecting means and text projecting means. Similarly the projector may incorporate text material to correspond to some of the text material appearing on the copy representation 1.

The image of the copy material is the projector 6 is positioned so that it corresponds to the position on the screen 4 of part of the image of the copy representation 1 and when it corresponds in size and position to the line of the copy representation 1, the mirror 5 is moved in such a way that an image of the line or text material is projected onto a film or other appropriate light sensitive material 7 in film box 8. This sequence of operations is continued until all the lines of the copy representation 1 are exposed on the film 7 so that the exposure of the film 7 corresponds to the copy representation 1.

Figure 2:
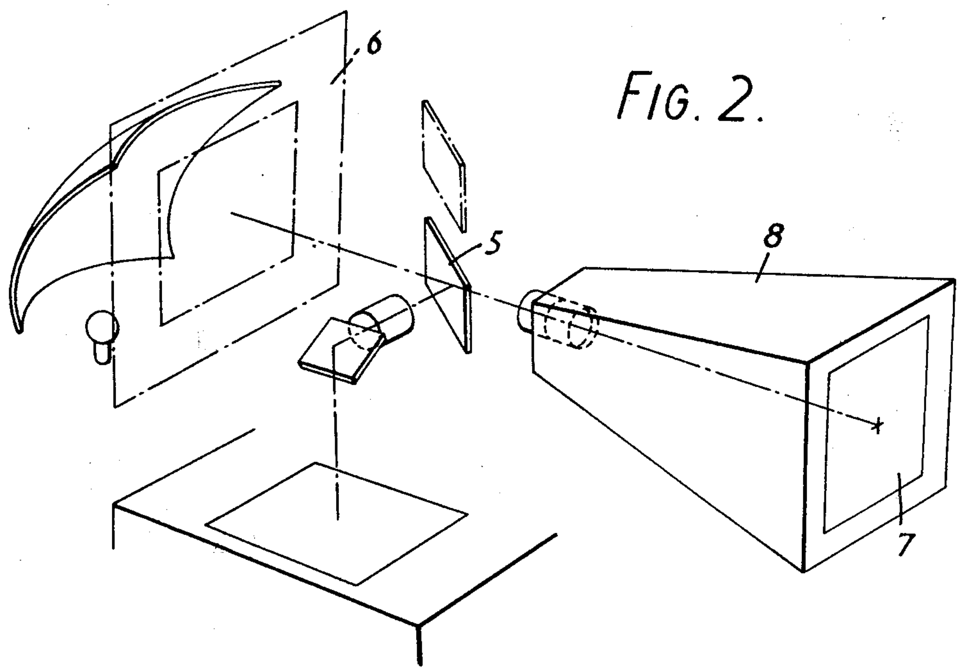
FIg 2 is a view of a second embodiment of projecting apparatus for the machine.

FIG. 2 corresponds to FIG. 1 except that instead of having a copy representation 1 projected onto the screen 4, the representation is projected onto the copy 1 so that it is aligned onto the actual copy rather than onto the viewing copy screen.

Figure 3A:
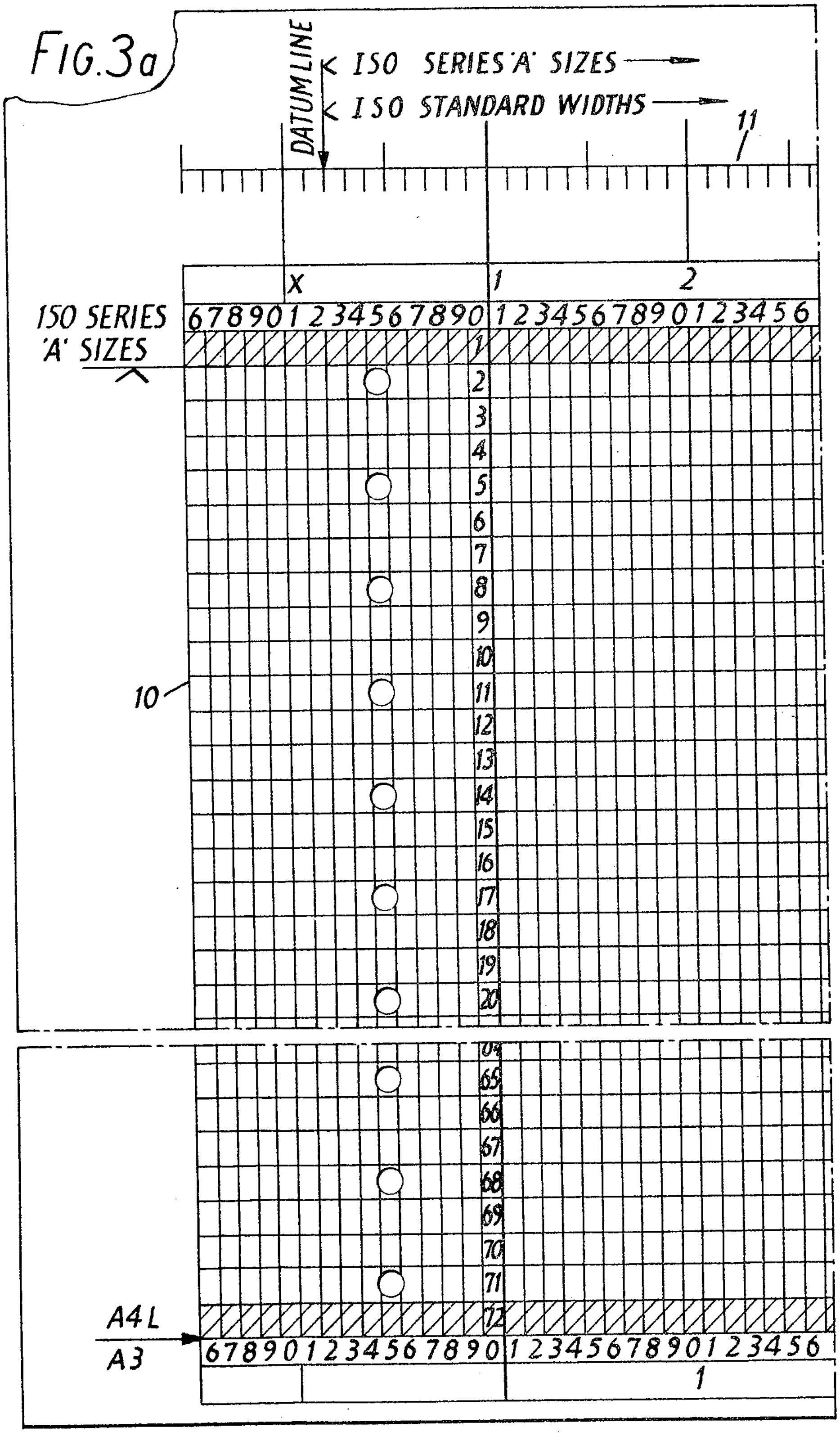
FIGS. 3A and 3B are diagrammatic views of the grid system.
Figure 3B:
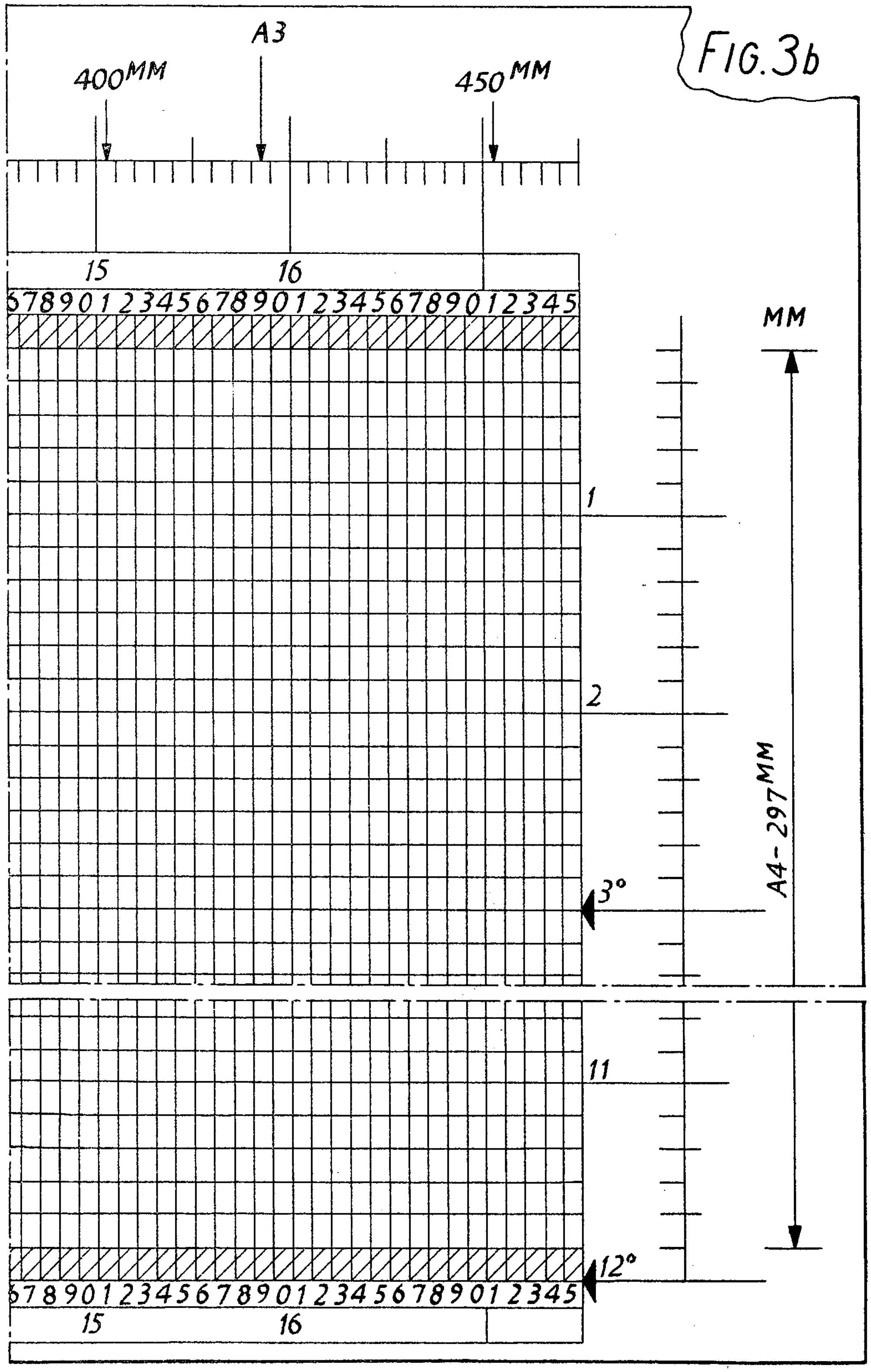

Referring to FIGS. 3A, 3B there is shown a chart with a vertical grid 10, a horizontal grid 11. The Grid 10 has lines spaced apart by distances of 1/6 inch (corresponding to the universally accepted vertical line spacing of a typewriter of 1/6of an inch). The horizontal grid has lines spaced apart by increment distances 1/10th inch (corresponding to the universally accepted horizontal transverse spacing on typewriter of 1/10th inch).

The grid illustrated in FIGS. 3A, 3B serves as a diagrammatic representation of a basic layout for which a business form can be designed and wherein the grid lines show diagrammatically the theoretically possible feeding positions of the business form. The grid is utilized to control the positioning of a carrier carrying a line or text mechanism which is more fully shown in FIG. 4.

In addition to the 1/6 in. vertical spacing and 1/10 in. horizontal spacing there are also shown the datum lines and the various 'A' form sizes of paper. As shown, there is included the longer horizontal component of the A3 form size and the shorter vertical component of the A3 form size (which may also be the longer vertical component of the A4 form size). There is also included metric measurement.

Figure 4:
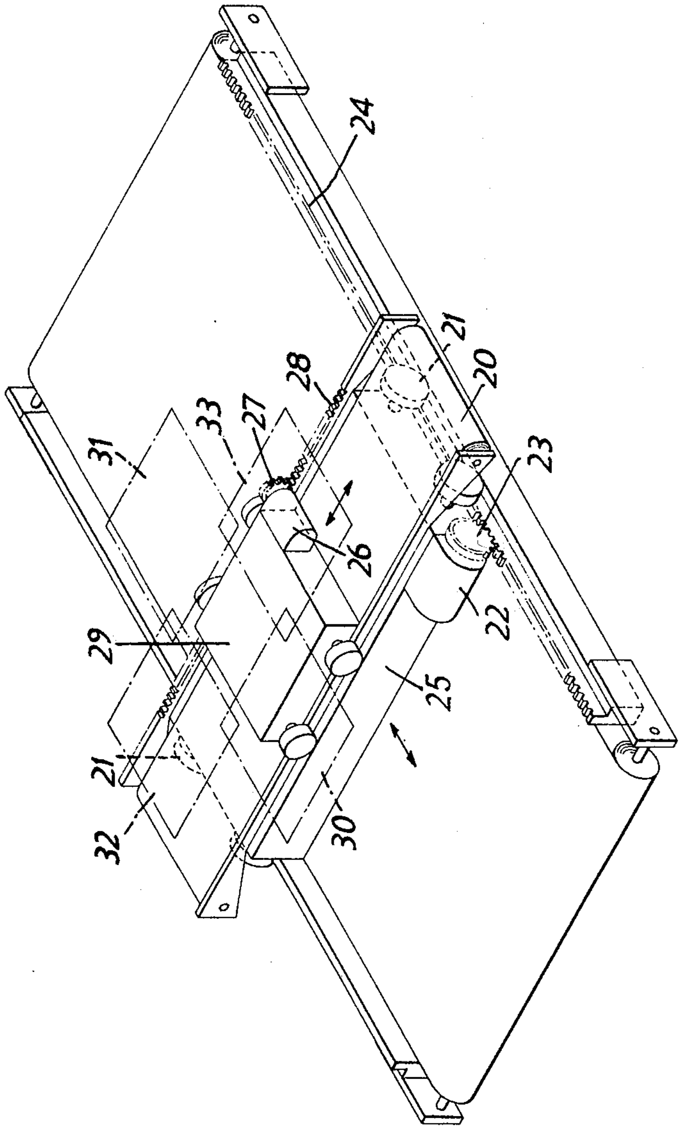
FIG. 4 is a view of the carrier mechanism for the projector means.

Referring to FIG. 4 there is whown a first carrier 20 mounted within the projector 6 of the photocomposing machine on two pairs of rollers 21. This carrier is movable in forward and reverse directions through the photocomposing machine. It is driven by a motor 22 preferably a stepping motor mounted on the carrier which drives a gear wheel 23 which engages with a toothed pinion 25 fixed within the photocomposing machine. A second carrier 29 is mounted on the first carrier 20 and this is movable in a forward reverse direction in a plane at right-angles to the plane of movement of the carrier 20. The carrier 29 likewise carries a stepping motor 26 with a drive wheel 27 which engages toothed rack 28 on the carrier 20. The carrier 25 as shown carries two line mechanism 28, 29. These line mechanisms may each comprise a printed sheet which is generally opaque but includes a straight line portion which is transparent and through which transparent straight line light can pass. A lamp mechanism (not shown) is mounted above the carrier in such a way that light passes through the transparent representation of a line from where it is projected (see FIG. 1) from a projector mechanism onto the screen 4 and also onto the film box 8 to expose the film.

In addition to the carriers 20,25 a pair of vertical masking shields 30,31 are disposed beneath the carriers and a pair of horizontal masking sheet members 32,33 are also placed beneath the carriers at either above or below the masking shields 30,31. Each of of the four masking sheilds is movable towards and away from a position beneath the line mechanism whereby unwanted material on the line mechanism is not projected out of the projector mechanism. By this means the length of line projected can be adjusted. These masking shields may have attached to their edges away from the lines mechanism a light shield preferably in the form of a spring loaded roller blind (not shown) to prevent passage of light through the areas adjacent the line mechanism.

The line mechanism may be used to project the vertical lines and the horizontal lines from the projector mechanism. The carrier carries at one side end of it representations of vertical lines of different thicknesses and likewise the carrier 25 also carries representations of horizontal lines also of different thickness. A line of the required thickness is selected so that the required thickness of a line can be exposed. The carrier 25 also carries additional representations, representing any required text matter to be incorporated on the business form in question.

Figure 5:
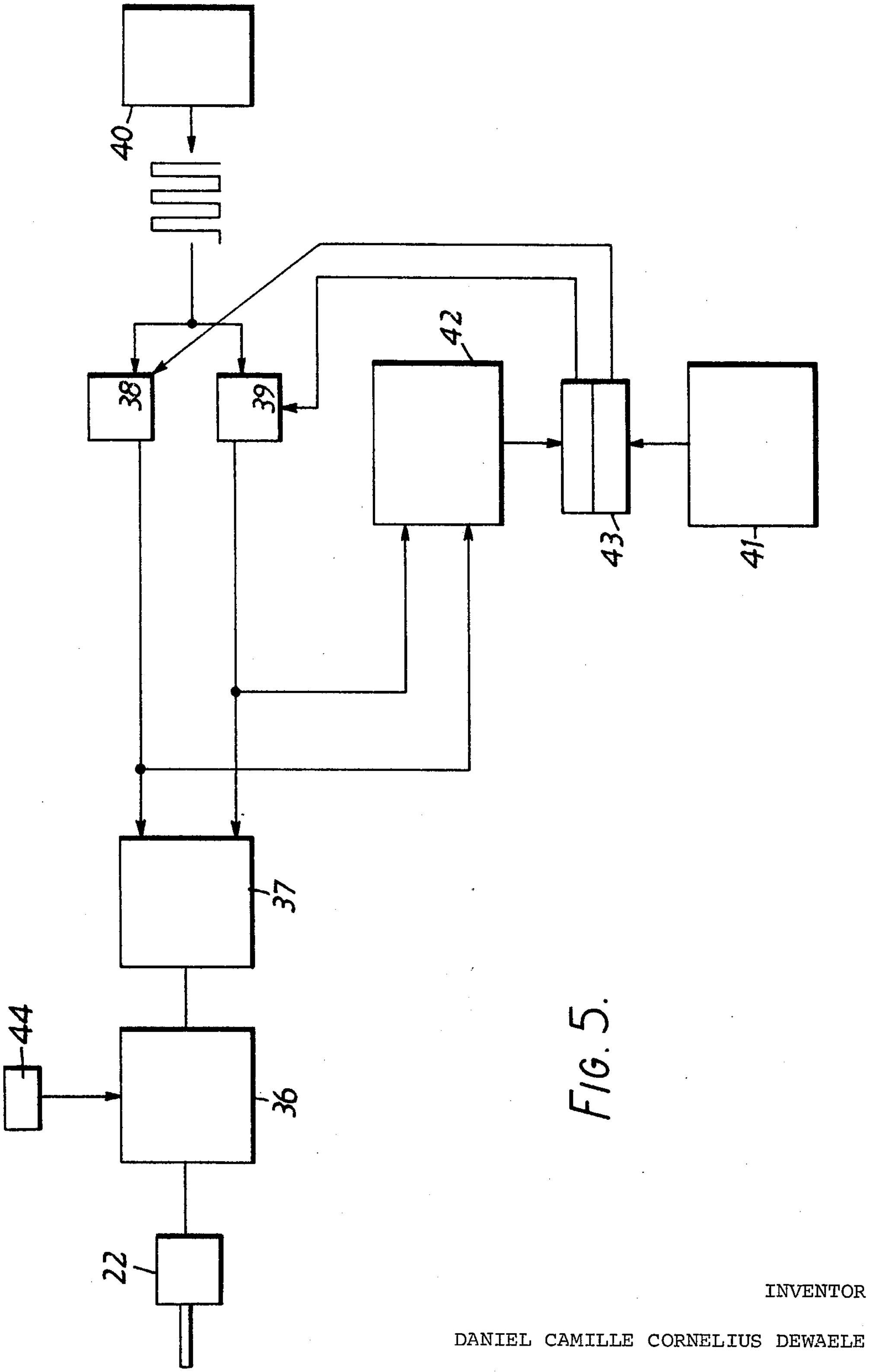
FIGS. 5 and 6 are circuit diagrams.

The line mechanisms and text mechanisms required are positioned in the projector mechanism under the control of an electronic circuit shown in block diagram form in FIG. 5 under the control of a grid representation as shown in FIG. 3. Thus FIGS. 3A, 3B shows one of the electric drive motors (say the motor 22) to control the movement of the carrier 20. It will be understood that similar circuits will be used to position the carrier 25 and the four masks. This motor 22 is supplied with pulses from a power amplifier circuit 36 which receives power from a power supply 44. Pulses are supplied to the power amplifier circuit 36 from a phase sequential circuit 37 which generates pulses under the control of one of a pair of outputs of control circuits 38,39. The pulses generated by control circuit, 39 are synchronized with clock pulses from a pulse transmitted generator 40 and one control circuit output is arranged to control the generation of pulses to move the motor 22 in a forward direction while the other control circuit output is arranged to control the generation of pulses to drive the motor in a reverse direction. The operation of control circuit 39 is manually initiated and is subsequently automatically controlled by a pulse transmitted from counter circuit 41 after the counter circuit has counted a number of clock pulses representative of the distance between successive horizontal grid lines shown in FIGS. 3A, 3B. Thus the distance between successive horizontal grid lines corresponds to a movement of the motor 22 and successive output pulses from counter circuit 41 are used to control the movement of the 25 by the successive horizontal grid line distances.

Figure 6:
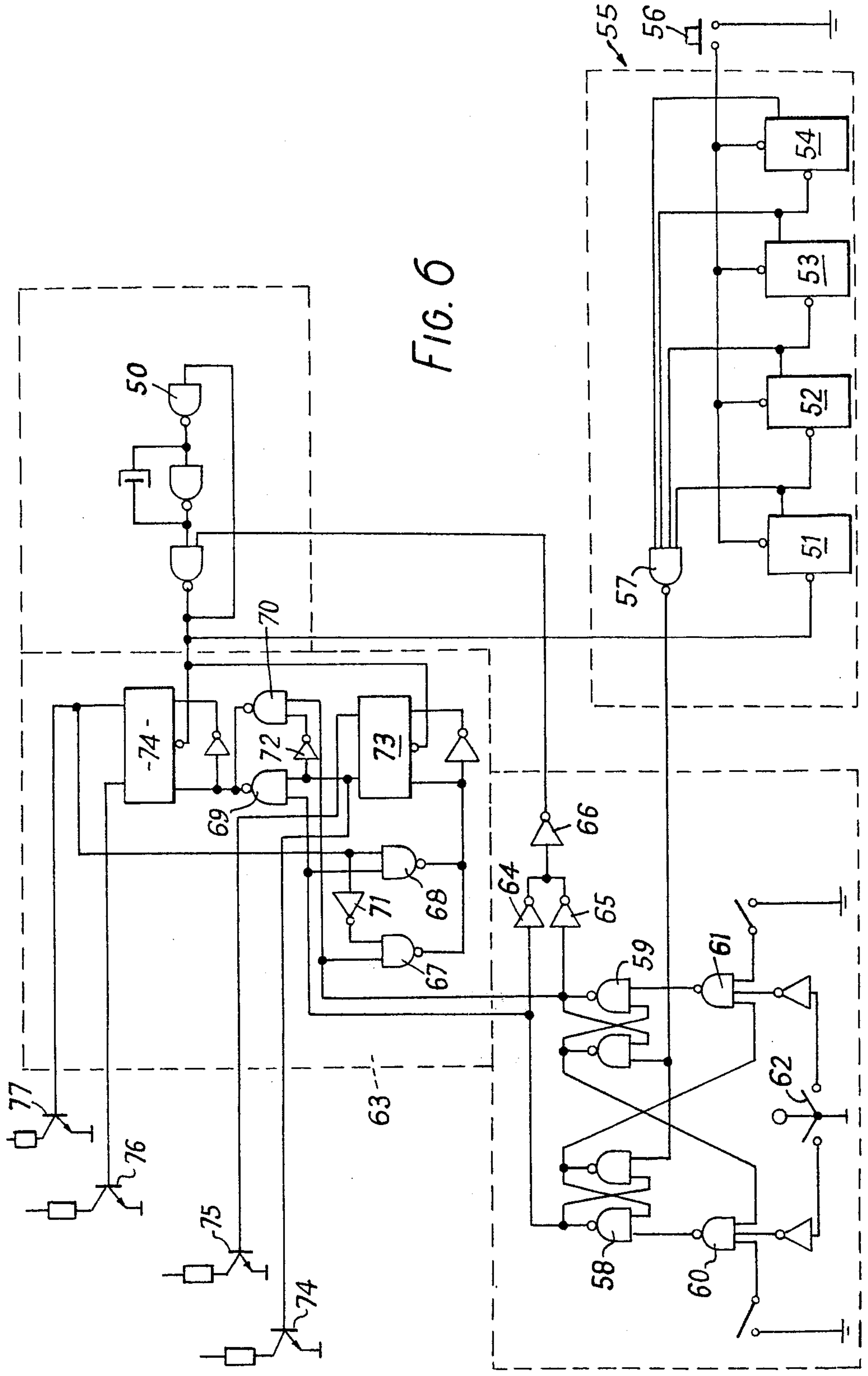

Thus if all the movement of the carriers takes place in connection with the exposure of horizontal lines the movement of the carrier 25 will be in increments of 1/10 inch. On the other hand if the carrier 25 is moved in a vertical direction, movement is made in increments of 1/6 inch. The counter circuit 41 therefore counts the number of clock pulses required to move the carriers by the pre-determined increments which are exact multiples of the 1/6 of an inch and 1/10 of an inch increments referred to. There is also included a counter mechanism 42 which receives pulses supplied from the gates 38, 39 to the logic circuit 37 so that the position of the carrier moving under the control of the motor 22 may be indicated. The counter 42 operates in conjunction with the register 41 to control the gate 43 and this gate 43 controls the gates 38, 39 to determine the number of pulses and whether these pulses are to move the carrier in a forward or reverse direction. In FIG. 6 amplifier circuit 36, phase sequential circuit 37, control circuit 39, pulse generator circuit 40, and counter circuit 41 are shown in greater detail than in FIG. 5. The circuits as shown are intended to drive a carrier in increments of 1/10 inch (one tenth of an inch) in which case the stepping drive motors are so geared that they drive the appropriate carrier a distance of one inch on receipt of 160 pulses.

As pulse generator 40 includes a symmetrical multivibrator circuit 50 which is connected as an endless loop with a two-input NAND gate 48 and an inverting NAND gate 49 constitutes a pulse generator which supplies through NAND gate 48, pulses to counting circuit 41 which comprises a plurality of binary circuits 51, 52, 53, 54 arranged in cascade so that these circuits together provide a counting circuit which counts up to 16. These binary circuits are provided with a switch shown diagrammatically at 56 to return the binary circuits to their zero conditions.

The outputs of the binary circuits 51, 52, 53, 54 are connected to a Nand gate 57 whose output is connected to respective inputs of a pair of Nand gate circuits which are each part of a pair of set and reset flip flop circuits 58, 59 in parallel and constitute means for generating a grid signal. A second nand gate circuit of the flip flop circuit 58 is driven from a further and forward driving nand gate circuit 60 and a second nand gate circuit of the flip flop circuit 59 is driven from a further and rearward driving nand gate circuit 61. Each of the nand gate 60,61 is connected through an inverting Nand gate to a common three position controller switch 62. This switch can either be in the 'off' position (as shown) or positioned to supply a negative supply to either the forward or reward driving nand gates 60 or 61 respectively to drive motor 22 to move carrier 25 in a forward or rearward direction. Another input to the nand gates 60,61 is connected through limit switches 79 to a negative potential to stop the drive when the motor 22 has driven carrier 25 nearly to the limit of its travel. There is also a connection from the outputs of the first Nand gates flip flop circuits 59,58 to the inputs of NAND gates 60,61 respectively.

A connection is made from the respective outputs of the second NAND gates of the respective flip flop circuits 58, 59 to a phase sequential circuit 37. The forward-driving flip-flop circuit 58 drives the circuit 37 to cause the motor to drive clockwise whereas the rearward-driving flip-flop 22 circuit 59 drives the circuit 63 to cause motors 22 to drive anti-clockwise. A connection is also made from the outputs of the second NAND gates of the circuits 58,59 through exclusive NAND gate 64, and inverting Nand gate 66 to the Nand gate 48 of symmetrical multivibrator 50 to stop the multivibrator at the end of a particular train of pulses as described later, when the controller switch 62 is returned to its off position.

The phase sequential circuit 63 comprises two pairs of nand gates 67, 68, 69, 70, the gates of each pair being connected to a respective nand gate with single input 71, inverting nand gates 72. The common output and the inverted common output of the nand gates 67, 68 are connected to the two inputs respectively of the J-K bestable circuit 73 whereas the common output and the inverted common output of the nand gates 69, 70 are connected to the J-K bistable circuit 74.

The bistable circuits 73, 74 of the phase sequential circuit 63 are each supplied with a train of pulses from the symmetric multivibrator 50. The outputs Q, Q of the bistable circuits 73 and 74 respectively are connected to respective power amplifier circuits 75, 76, 77, 78 which in turn are connected to the windings of the drive motor 22 whereby the motor is driven clockwise or anti-clockwise whereby the motor drives the carrier forwards or rearwards respectively. The operation of such a motor and motor circuit is more fully described in U.S. patent application Ser. No. 189,504, filed Oct. 15, 1971.

The symmetric multivibrator 50 supplies a train of pulses and these pulses are passed to the drive motor 22 to drive the carrier. The gearing is so arranged that on receipt of 160 pulses by the motor the carrier is driven by 1 inch. When both inputs of Exclusive OR gate 64 are at logic "1", as they are with the conditions shown in FIG. 6, NAND gate 48 stops the clock pulses from multivibrator 50. When the controller switch 62 is manually operated to connect, for example, NAND gate 60 to a negative potential, the output of NAND gate 60 changes to a logic "1" and the second NAND gate of circuit 58 changes to a logic "0" so that the output of inverting NAND gate 66 changes the input of NAND gate 48 to logic "0" to allow multivibrator pulses to reach the bistable. circuits 51,52,53,54. Each pulse is applied to the circuit 51, and each alternate pulse causes the circuit 52 to be energised each fourth pulse causes the circuit 53 to be energised and each eighth pulse causes the circuit 54 to be energised. When all the circuits are energised (on the receipt of sixteen pulses) all the input connections to the nand gate 57 are positive at logic "0" so the gate is operative to pass a negative signal (i.e. logic "1") to the nand gates of circuits 58,59 to ensure that the outputs of these NAND gates are at logic "0". The second NAND gates of circuits 58, 59 are not effected. If at that time the controller switch is still operated the output of the nand gate 60 remains at logic "1" and the clock pulses continue because the second NAND gate of circuit 58 changes back to logic "1" output after the sixteenth pulse, but if before the sixteenth pulse controller switch 62 is returned to the OFF position (as shown) the output of NAND gate 60 will have returned to logic "0" and the sixteenth pulse will cause the second NAND gate of circuit 58 to return to logic "1". This will cause a stop signal to be applied to the multivibrator 50 to stop the supply of further pulses to the motor and the motor will be halted with the carrier in the accurately located position.

It will be apparent that the number of pulses supplied by the symetric multivibrator to the drive motor 22 (or other motor) may be varied to drive these motors by different distances as likewise the cascade circuit 51,52,53,54 may be varied to supply an output pulse on receipt of a different number of pulses. Thus, for example, if it is required to drive the motor under the control of a theoretical grid spacing of 1/6 (one sixth) of an inch the motor may drive the carrier inch in receipt of 182 pulses. Similarly the cascade circuits 51, 52, 53, 54 may be replaced by five binary circuits which constitutes "count up to 32 circuit". Such a circuit may be utilized to control the vertical spacing of the positioning of the carrier on the business form.

It is also possible to modify the invention by including some other control means which will be included so that the position of the exposure may be determined approximately but the position of the exposure may be determined accurately by the grid line counting means. Thus for example a magnetic head mounted on a movable part say the film carrier, may co-operate with a magnetic tape mounted on a stationery part and on which tape there is recorded a signal which is positioned to correspond to positions on the film to be exposed. The carrier is moved under the control of the switch 62 and under the control of the magnetic head/-magnetic tape device. The carrier is driven by the motor which movement is initiated by the switch 62 and is continued until the head moves to a signal position on the tape. The drive is then only under the control of the grid line counting means and when the grid line counting means reaches the grid line position the drive is halted so that the carrier is accurately located.

What we claim is:

1. A photocomposing machine comprising: means to project an image corresponding to a portion of a copy form onto a sensitized material whereby image parts of the copy form are built up in steps onto the sensitized material, means for controlling the position of the image corresponding to said portion of the copy form onto said sensitized material including carrier means for supporting a representation of the images, drive means for moving said carrier means, pulse generating means to drive said drive means in two orthogonal directions, control means for generating signals to control said drive means and including counting means to count the number of pulses supplied to said drive means and means to stop said drive means at a selected position of a plurality of predetermined positions represented by said number of pulses when said counting means has counted to a predetermined number representing a respective position of said plurality of predetermined positions.

2. A photocomposing machine as in claim 1 wherein said control means further includes means for generating a train of pulses, means responsive to said trains of pulses for generating an output signal in response to a predetermined number of pulses corresponding to the distance between adjacent positions, and gating means responsive to said output signal for gating said pulse train to said drive means.

3. A photocomposing machine as in claim 2 wherein said carrier means includes a first and second carrier each movable along respective orthogonal axes and said drive means includes first and second drive means for respectively moving said first and second carrier, said first carrier is mounted on said second carrier and supports said copy form, said first and second drive means each include a step motor for respectively moving said first and second carrier, said gating means for each of said first and second drive means includes first and second gate means for respectively driving said step motor in one direction or the opposite direction whereby said first and second carrier are moved in one direction or the opposite direction along the respective axes thereof, switching means for actuating said first or said second gate means and means interconnecting said first and said second gate means with said pulse generator for terminating the generation of pulses therefrom when said carrier means is moved to a desired position.

4. Control apparatus as in claim 3 wherein said gating means further includes first and second bistable circuits each respectively responsive to said first and second gate means, and wherein said control means further includes first and second pairs of amplifiers responsive respectively to said first and second bistable circuits for driving said step motor in a direction determined by said switching means.

* * * * *